United States Patent Office 3,169,667
Patented Feb. 16, 1965

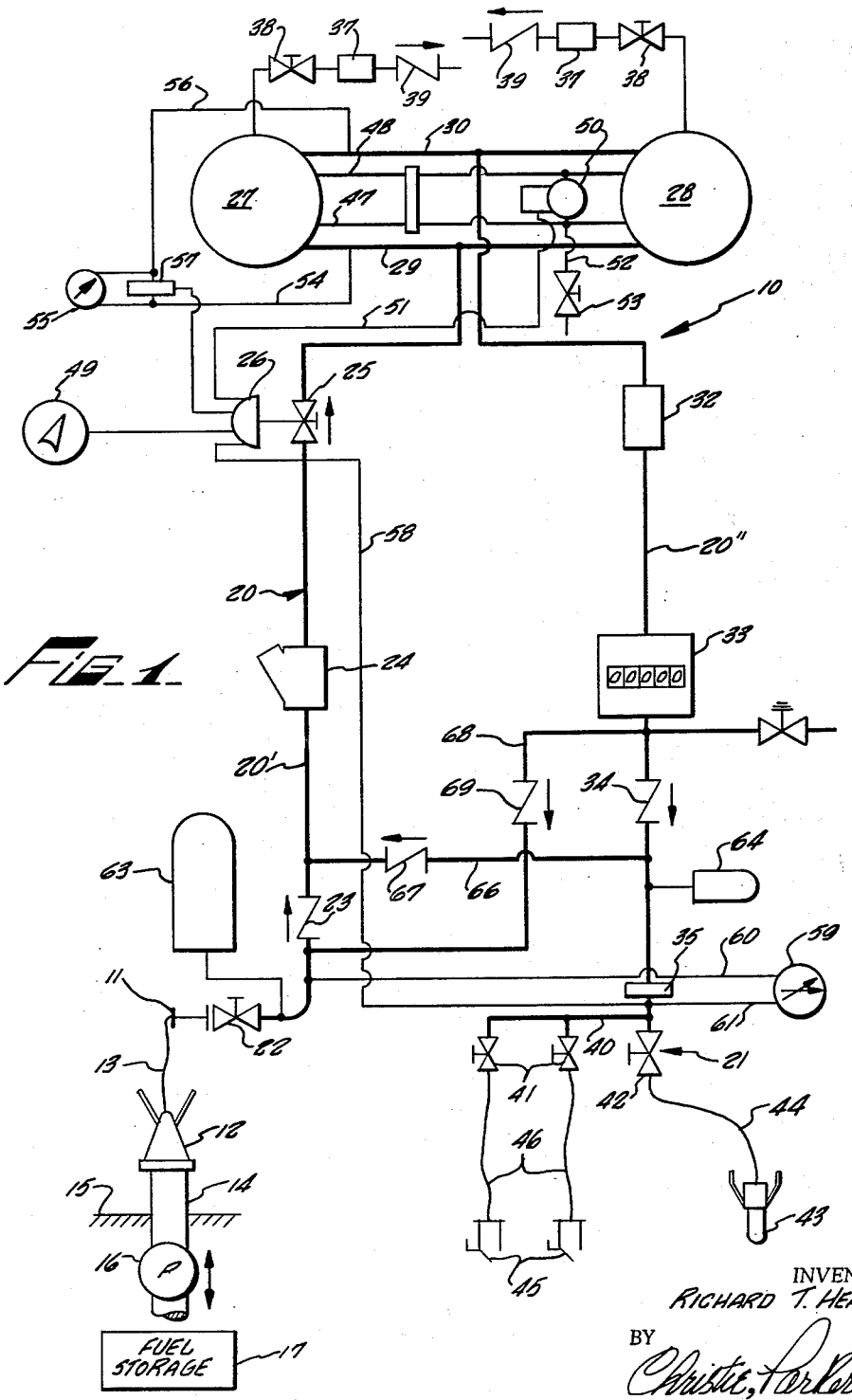

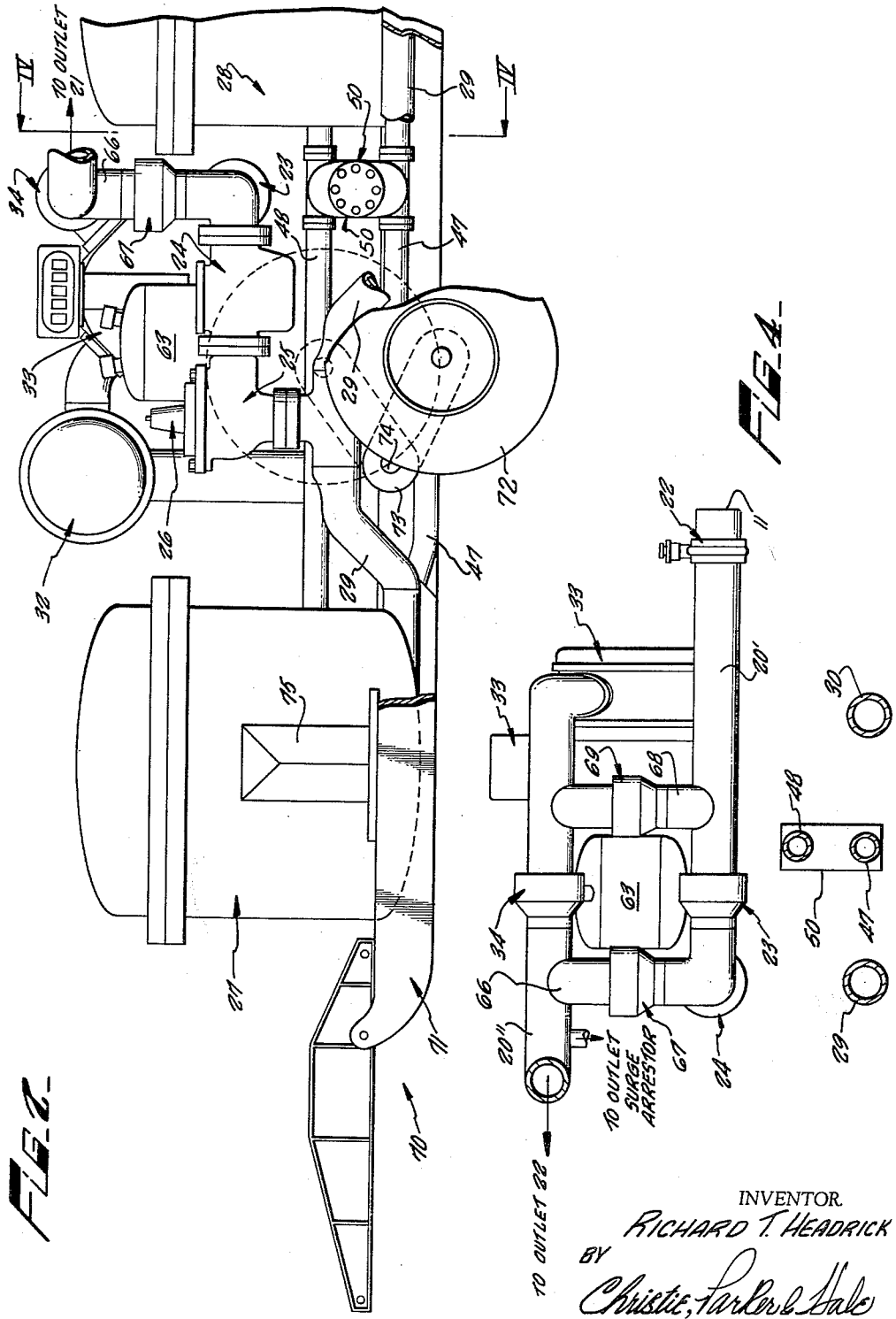

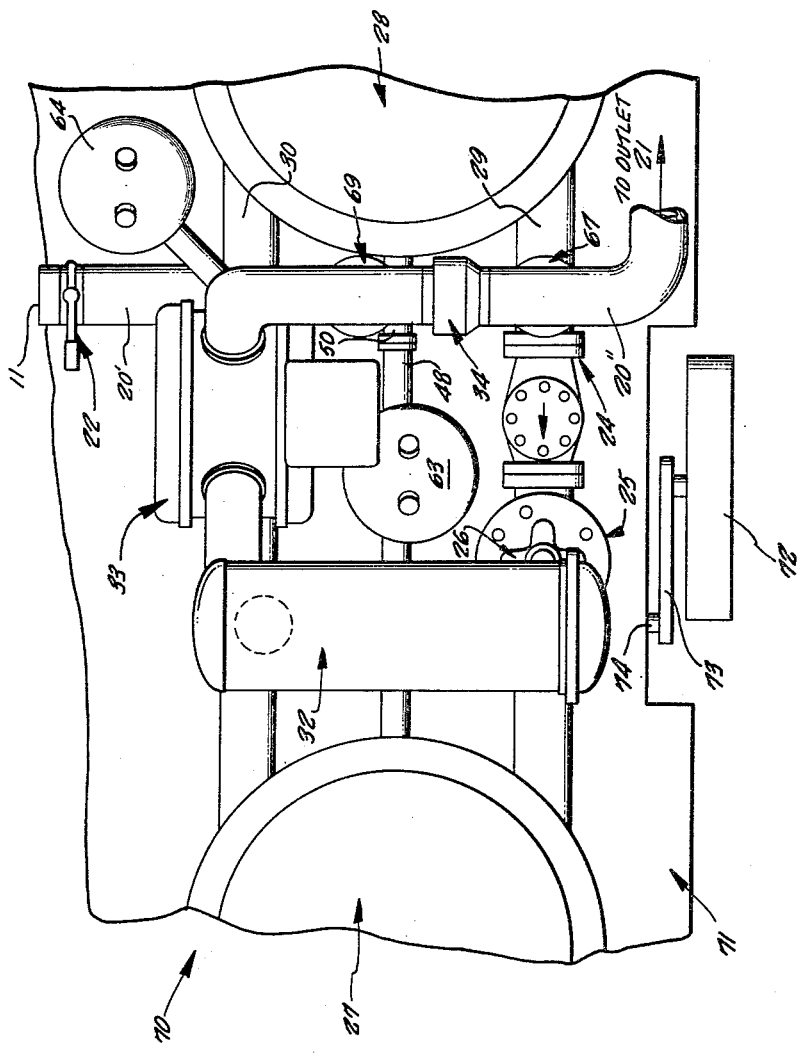

3,169,667
AIRCRAFT FUEL AND DEFUEL APPARATUS
Richard T. Headrick, 916 Crestfield Ave.,
Duarte, Calif.
Continuation of application Ser. No. 198,925, May 31, 1962. This application Aug. 10, 1964, Ser. No. 389,825
12 Claims. (Cl. 222—23)

This invention relates to liquid handling apparatus and systems. More particularly, this invention relates to apparatus and systems for fueling and defueling aircraft.

While this invention has great advantage in military aircraft fueling operations, the invention also may be used beneficially in conjunction with commercial aircraft. Conventional fueling systems for aircraft have temporary or permanent fuel outlets from permanent or temporary fuel sources. In the case of a permanent fuel outlet, the fuel outlet is a hydrant which projects above the ground along or adjacent to the flight-line at which the aircraft to be fueled is parked. The temporary installation, on the other hand, may be a tank farm installation as is disclosed in my co-pending application, Serial No. 42,104, filed July 11, 1960, now United States Patent No. 3,111,-968, for "Apparatus for Transporting Fluids."

Preferably the apparatus of this invention is mounted on a wheeled cart and presents a low profile when viewed in elevation. The wheels of the cart preferably are retractable to facilitate movement of the cart by air where cargo space is at a premium. Alternatively, the apparatus of the invention is mounted on a pallet to provide a versatile modular unit. The pallet mounted apparatus is conveniently handled by a fork truck and may be disposed on the bed of a flat bed truck. Additionally, a pallet mounted modular unit is particularly adapted for parachute dropping location from a cargo transport aircraft to a remote location which does not permit landing and take-off of the cargo aircraft.

Fueling and defueling systems known heretofore have been limited in several respects, especially as to the defueling operation. The apparatus of this invention provides for full treatment of fuel during a defuel operation, whereas apparatus of the prior art does not provide such features. The system uses conventional and available equipment to an advantage not previously possible and provides unexpected results since the apparatus provides larger capacity and longer life than would normally be the case with the enlargement of existing systems.

The fuel handling system is adapted to deliver fuel therefrom at one of two separate pressure levels. Conventional centerpoint-nozzle fuel handling apparatus may be used at the high pressure level, and conventional overwing fueling techniques may be practiced when the system is operating at its low pressure.

Generally speaking, the invention provides a fuel distributing and cleaning apparatus for fueling of aircraft. The apparatus comprises a fuel inlet which is connectable to a fuel source and a fuel outlet. At least one fuel-water separation unit is connected in fluid flow relation between the inlet and outlet, and a fuel flow conduit connects the separator unit between the fuel inlet and the fuel outlet. A fuel flow control valve is disposed in the fuel flow conduit. Fuel strainer means are provided in the fuel flow conduit between the separation unit and the inlet. The invention further comprises a fuel monitoring means in the fluid flow conduit between the separation unit and the outlets. The monitoring means is responsive to terminate flow of fuel through the monitoring means when water is present in the fuel flowing therethrough. The invention further comprises a fuel metering means in the fuel flow conduit between the separation unit and the outlet. Defueling cross-connections are provided between the inlet and outlet ends of the fuel flow conduit whereby fuel introduced into the apparatus through the outlet is circulated through all of the elements which are operative during the fueling operation. Following such circulation during a defueling cycle, the fuel is discharged from the apparatus through the inlet for transmission to a fuel storage area.

The above mentioned and other features and objects of the invention will be more clearly described in the following detailed explanation of the invention taken in conjunction with the accompanying drawings, wherein:

FIG. 1 is a schematic representation of the fueling and defueling systems;

FIG. 2 is a side elevational view of a preferred embodiment of the system of this invention mounted upon a retractable wheeled chassis;

FIG. 3 is a top plan view of the apparatus illustrated in FIG. 2; and

FIG. 4 is a cross-sectional elevation taken along the line IV—IV of FIG. 2.

In FIG. 1 a fuel and defuel system 10 according to this invention is schematically illustrated. The system has an inlet 11 which is connected to a hydrant adapter 12 provided at the end of a suitable length of suction hose 13. Preferably, the hose 13 is a four inch diameter hose consistent with the diameter of the ducting provided within the extent of system 10. The hydrant adapter 12 is connected to a fuel source 14. In permanent fuel storage installations, the fuel source 14 is a hydrant which projects above the level of ground 15 adjacent the location at which the fueling system 10 is to be used. The hydrant 14 is connected to a reversible fuel pump means 16 and thence to a fuel storage area 17. The fuel pump means 16 may comprise one or two pumps. Where one pump is provided, the pump should be reversible in order that the single pump provide both fuel and defuel circulation through system 10. In many installations, however, the pump means 16 is actually two separate pumps; one pumping fuel to an aircraft during a fueling operation, the other transferring fuel from an airplane or aircraft during a defueling operation. In the permanent installation, the fuel storage area 17 may be permanently constructed tanks maintained under or above ground at a location remote from the hydrant. As illustrated in my co-pending application, referred to above, where a temporary installation is provided, the fuel storage area conveniently may be a series of collapsible, flexible, rubberized pillow tanks.

The inlet 11 is at one end of a fuel flow conduit 20 which connects the inlet to a pair of fuel water separation elements 27 and 28 and to a fuel outlet 21. The fuel flow conduit 20 has an inlet portion 20' between the inlet 11 and the separation units and an outlet portion 20" between the separation units and outlet 21. A manually operated inlet control valve 22 is provided adjacent inlet 11 in the fuel flow conduit inlet portion 20'. Downstream of the inlet control valve 22, in serial order, a check valve 23, a strainer unit 24 and a fuel flow control valve 25 are disposed in the fuel flow conduit 20. Check valve 23 permits fuel flow from inlet 11 to the strainer means 24. In a preferred embodiment of the invention, the strainer means 24 is a forty mesh screen filter and strainer unit of the type manufactured by Coach & Car Equipment Company, Chicago, Illinois. The fuel flow control valve 25 has several control functions which will be described in detail below. It is sufficient at this point to state that one of these functions is a check valve function such that fuel flow is in the direction toward the fuel water separation units 27 and 28. In a preferred embodiment of the invention, the fuel flow control valve 25 is a diaphragm operated valve of the type manufactured by Cla-Val Company, Newport Beach, California.

A pair of fuel water separation units 27 and 28 are provided as elements of the system 10. The units 27 and 28 are of the fuel-water suspension dispersion type and internally thereof provide a column for distributing a fuel-water mixture axially over the length of the separator. After discharge from the axial distribution column, the fuel-water mixture flows radially at low velocity through a Teflon coated 100 mesh wire screen. Teflon is a trademark owned by E. I. du Pont de Nemours & Co., Inc., Wilmington, Delaware, and is used by the owner to identify tetrafluoroethylene manufactured by it. As the fuel-water mixture flows radially through the axial distribution column, the droplets of water suspended in the fuel are retained in the composition of the column, there to coalesce into droplets which migrate radially through the column. On the emergence from the distribution column, the water droplets fall downwardly in an annular space between the column and the Teflon coated screen. The radial flow velocity of the fuel in this annular chamber is insufficient to re-entrain these water droplets into the fuel such that the water droplets fall to and accumulate in the lower portion of the separator chamber. The filter separators 27 and 28 do not form a part of this invention other than as a component of the system 10. Fuel-water suspension dispersion separators of the type described above are available from the Warner Lewis Company, Division of Fram Corporation, Tulsa, Oklahoma, and are consistent with Department of Defense military specification MIL-F-8901.

A separator inlet cross-connection conduit 29 is connected to the inlet side 20' of the fuel flow conduit 20 and extends between the separation units 27 and 28. The inlet cross-connection conduit 29, as well as an outlet cross-connection conduit 30 are connected to the lower ends of the separation units 27 and 28. The separator outlet cross-connection 30 is connected to the outlet portion 20" of the fuel flow conduit as illustrated in FIG. 1. It is therefore seen that the fuel-water separation units 27 and 28 are connected in parallel fluid flow relation between the inlet 11 and the outlet 21 of the system 10.

Between the separator outlet cross-connection 30 and the outlet 21 of the system 10, the fuel flow conduit 20 includes, in serial order, a water monitor 32, a meter 33 and a check valve 34. The water monitor 32 preferably is of the cartridge type and permits the flow of fluid through the bed when the fuel is devoid of the presence of water. When the fuel flowing through the monitor 32 contains water, however, the cartridges block flow of fuel through the system 10. Such a monitor is referred to in the fuel handling art as a Go/No-Go water and contamination fuse device; devices of this type are available from The Filter Division, Bendix Corporation, Madison Heights, Michigan. The monitor 32 automatically shuts off fluid flow if it senses either water or solid contamination in the fuel, indicating a highly unlikely rupture of an element in one of the filter separators 27 or 28. After flow through the monitor 32, the fuel is passed through a meter 33 which indicates, for visual observation, the gallonage of fuel passing through the meter. Preferably, the meter 33 has a six hundred gallon per minute capacity. Between the meter 33 and the system outlet 21, the cleaned and treated fuel passes through check valve 34 which is disposed in the fuel flow conduit 20 to permit flow in the direction of the outlet 21. As illustrated in FIG. 1 a sight glass unit 35 is provided adjacent outlet 21 so that an operator of the system 31 may observe visually the quality of cleanliness of the fuel passing through the system.

Each of the filter separators 27 and 28 preferably is rated for a three hundred gallon per minute (300 g.p.m.) flow capacity, but in practice with the system 10 filter separators rated at three hundred g.p.m. exhibit a capacity in excess of the rated capacity. Each of the filter separators 27 and 28 is provided with its own automatic air eliminator 37 connected to the upper end of the separation unit vessels and mounted between a manual air flow control valve 38 and a check valve 39. Check valves 39 are connected to the air eliminators 37 such that air may flow from the filter separators 27 and 28, but air may not re-enter separator chambers.

The outlet 21 from system 10 comprises a manifold 40 to which are connected a plurality of valves. A pair of manually operated two inch gate valves 41 are connected to manifold 40. A manually operated four inch gate valve 42 is also connected to the manifold 40. A conventional centerpoint fueling nozzle 43 is connected to the four inch valve 42 by means of a suitable length of four inch reinforced suction tubing 44. The tubing or hose 44 is reinforced to prevent complete collapse of the tube when the tube is under suction from the pump means 16 during a defueling operation. Over-wing fueling nozzles 45 are connected to each of the valves 41 by suitable lengths of two inch reinforced suction hose 46.

When fueling through the center point nozzle 43, fuel pressures of 50, plus or minus 5 pounds per square inch gage, are permissible at full flow. Pressures up to 65 p.s.i.g. are permissible at zero flow through the system, however. When fueling an aircraft through the use of the over-wing nozzles 45, the pressures permissible in the fueling process are on the order of 15 plus or minus 5 p.s.i.g., which pressures are dictated by the fuel system of the aircraft rather than by the system 10 of this invention. Accordingly, the system 10 includes a pressure selector control 49 which is connected to a control dome 26 of the diaphragm operated flow control valve 25. The selector 49 is operable to select one of two pressure conditions for operation of system 10, these conditions being 15 p.s.i.g. and 50 p.s.i.g. The selector 49 also has a third function which is an "Off" function whereby the diaphragm valve 25 is closed to flow of fuel through the valve.

The fuel water separation units 27 and 28 are cross-connected to provide equilibrium between the fuel and water levels therein. A water balance line 47 is connected between the filter separators 27 and 28 at the portions of the separators wherein the water accumulates during the suspension dispersion process. A fuel balance line 48 is connected between the filter separators at a location above the connection of the water balance line. The fuel balance line 48 is connected to the fuel separators at a location sufficiently spaced above the water balance line such that water normally does not accumulate in the fuel balance line 48. A fuel flow shut-off control unit 50 is connected between the water and fuel balance lines 47 and 48, respectively, and continuously monitors the equilibrized level of the water present in filter separators 27 and 28. When the equilibrium water level in the separators reaches a predetermined level, the water level monitoring unit 50 transmits a signal to the pressure controlled dome 26 of valve 25 via a control duct 51 to cause the flow control valve 25 to close. This closed condition is maintained until the water in the filter separators 27 and 28 is removed from system 10 through a drain connection 52 regulated by a manual gate valve 53 connected to the water balance line 47. In view of the parallel disposition of the filter separator units, and further in view of the water and fuel balance cross-connections between the separators, the total capacity of the separators in system 10 is extended over that which would normally be expected where such units are connected in series. If either of the filter separators 27 and 28 becomes clogged with sediment such that flow is restricted through that particular separator, flow is divided in the parallel flow network into other separators and maximum capacity of the system is maintained. Since the water levels between the two separators 27 and 28 are equalized, extended operation of the separators is possible between those periods when the system 10 must be drained through connection 52 because an excess level of water has accumulated in the separators. Normally, without the water level equalization connection 47 it is entirely possible that one or the other of the separators may accumulate an unusually large amount of water, whereas the other filter unit may not. If the separators 27 and 28 are connected in series without any auxiliary interconnection therebetween, then the first separator to become filled with water determines the shutdown characteristic of the system 10.

It was mentioned above that the flow control valve 25 has several control functions, one of which is the "Off" function indicated by the presence of a predetermined water level in the filter separators 27 and 28. A second control function of the flow control valve 25 is derived from the pressure drop existing across the parallelly connected filter separators 27 and 28. A pressure sensing duct 54 is connected to the separator inlet cross-connection duct 29 and extends to a differential pressure gage 55. A second pressure sensing duct 56 extends from the separator outlet cross-connection duct 30 to the differential pressure gage 55. A pressure differential responsive unit 57, preferably of the diaphragm type, is connected between the pressure sensing lines 54 and 56 and is further connected to the control dome 26 of the fuel flow control valve 25. When the pressure differential manifested between the pressure sensing lines 54 and 55 reaches a predetermined value, indicating that the filter separators 27 and 28 are clogged such that fuel flow is not occurring therethrough, the diaphragm unit 57 is operable to transmit a signal to the control dome 26 whereby the control valve 25 is turned to an "Off" condition. A third control function of the flow control valve 25 is in response to the pressure manifested adjacent the outlet 21 from system 10. Accordingly, a pressure sensing duct 58 is connected between the control dome 26 of valve 25 and the outlet side of the fuel flow conduit 20 whereby pressure exceeding a predetermined level at the outlet 21 causes the flow control valve 25 to be placed into an "Off" condition. This predetermined pressure level normally is realized as a result of a closure of the nozzles 43 and 45 used in fueling an aircraft or from the closure of a valve in the fuel system of the aircraft.

As an over-all check on the operation of the system 10, a pressure gage 59, having two separate pressure indicating dials thereon, is connected across the system 10 by a pair of pressure sensing ducts 60 and 61. Pressure sensing duct 60 extends between gage 59 and the inlet portion 20' of the fuel conduit 20 while sensing duct 61 extends from the gage 59 to the outlet portion 20" of fuel flow conduit 20.

A novel feature of this invention is the provision of surge arrestors for both the inlet and outlet sides of the system 10. As illustrated in FIG. 1 a surge arrestor 63 is connected to the system 10 between inlet 11 and the inlet check valve 23. A second surge arrestor 64 is connected to the outlet side of system 10 between the outlet check valve 34 and the outlet manifold 40. As represented in FIG. 1, the outlet surge arrestor 64 has a smaller capacity than the inlet surge arrestor 63. The outlet surge arrestor 64 must have a capacity sufficient to accommodate surges in the lines between the arrestor 63 and an aircraft being fueled or defueled. The inlet surge arrestor, on the other hand, must have a capacity sufficient to accommodate surges in fuel pressure building up in the ducting between the fuel storage area 17 and the surge arrestor 64; in many cases a considerable volume of fuel is involved in such ducting. The surge arrestors must be placed between the inlets and outlets 11 and 21 and the inlet and outlet check valves 23 and 34 in the inlets and outlets 11 and 21, respectively, in order that the fuel intaken into the surge arrestor 63 or 64 during the process of arresting the surge can be dissipated into the ducting as the surge arrestor returns to a normal condition.

To accommodate defueling operations of the system 10, a first defueling conduit 66 is connected between the fuel flow conduit 20" at a location intermediate the outlet check valve 34 and the outlet manifold 21. The first defueling conduit 66 is also connected to the fuel flow conduit 20' at a location intermediate the inlet check valve 23 and the strainer means 24. A check valve 67 is provided within the extent of the first defueling conduit 66 and permits flow of fuel therethrough in a direction toward the strainer means 24. A second defueling conduit 68 is connected to the fuel flow conduit 20" intermediate the meter 33 and the outlet check valve 34 and has its opposite end connected to the inlet portion 20' of the fuel flow conduit 20 between the inlet check valve 23 and the inlet 11. A check valve 69 is provided within the extent of the second defueling conduit 68 and permits flow of fluid therethrough in the direction of the inlet 11. During a defueling operation, whether the fuel is introduced into the system 10 through the center point nozzle or through one or both of the over-wing nozzles 45, the fuel flow is according to the following sequence. The fluid is introduced into the system 10 through the outlet 21 and proceeds into the first portion 20' of the fuel flow conduit 20 through the first defueling conduit 66 and check valve 67. In this case, check valves 23 and 34 are closed. The fuel is then passed in sequence through the strainer 24, the control valve 25, the parallelly connected separation units 27 and 28, the water monitor 32 and the meter 33. Upon emerging from meter 33 the defuel-cycling fuel is passed through the second defueling conduit 68 and through check valve 69 to exit from the system 10 via inlet 11. The flow is through the second defueling conduit 68 since the outlet check valve 34 is maintained in a closed condition because of the pressure differential existing across valve 34. As illustrated in FIG. 1, during the normal fueling operation there is no flow through the defueling conduits 66 or 68 because of the orientation of the check valves 67 and 69. The defueling conduits 66 and 68 are of the same diameter as the fuel flow conduit 20 which preferably has a four inch diameter in the embodiment of the system illustrated in FIGS. 2, 3, and 4.

During a defueling operation fuel is circulated through system 10 either by pump means 16 or by a fuel pump located in the aircraft being defueled since the system 10 itself does not include a fuel pump.

From the foregoing explanation of the system as presented in conjunction with the schematic illustration of FIG. 1, a system has been described which provides for complete sediment and water removal during both fueling and defueling operations. This is a novel feature in aircraft fueling and defueling systems. Furthermore, the system provides surge arrestors in conjunction with both the inlet and outlet sides of the system 10. Systems previously known do not provide inlet surge arrestors. This has led to troublesome problems because closure of a valve within the system to prevent a surge from reaching the aircraft often amplifies the surge waves experienced in the inlet circuitry. These amplified waves often shear hydrant fittings or rupture hoses. A further feature of the invention is that during a fueling cycle or a defueling cycle, flow of fuel through the meter 33 is unidirectional. It is noted that in previous systems wherein meters have been provided, the flow during a defueling cycle is opposite to the flow during the fueling cycle. The subtractive nature of the metering operation during a defueling cycle has led to errors, particularly in conjunction with the fueling cycle of certain military aircraft wherein the fuel tanks of the aircraft must be completely filled, then bled or defueled to a predetermined level, and then refueled. In many instances this fuel and defuel cycling occurs through several steps. The subtractive nature of the metering system of previous devices is a source of error in maintaining an accurate log of the quantity of fuel ultimately delivered to the aircraft.

Referring to FIGS. 2, 3, and 4, the fueling and defueling system 10 described above is illustrated as mounted upon a vehicle 70. The vehicle has a chassis 71 fabricated of structural members to which a pair of wheels 72 are mounted. The wheels are mounted to the chassis 71 such that the wheels 72 are retractable relative to the chassis 71 whereby the chassis 71 may be supported directly upon the ground. Each of the wheels 72 is rotatably mounted at one end of an arm 73 which has its other end secured to a transverse axle 74 extending laterally of the chassis 71. Mechanism (not shown) is provided in conjunction with axle 74 whereby axle 74 is rotated such that wheels 72 are moved about axle 74 to raise and lower the wheels relative to the chassis 71 as shown by the solid and dotted line positions of wheel 72 in FIG. 2.

The embodiment of the invention illustrated in FIGS. 2, 3, and 4 has been selected as typifying one of several means of mounting the system 10. The illustration of FIGS. 2, 3, and 4 show what is termed a "low profile" fuel and defuel unit and has particular advantage in military fuel and defueling situations. The low elevational profile of the embodiment illustrated permits airborne transportation of the vehicle 70. The airborne transportability of the vehicle 70 is enhanced since the wheels 72 may be retracted to further reduce the height of the vehicle to facilitate storage in a cargo transport aircraft where cargo space is often at a premium. It is within the scope of this invention, however, that the apparatus illustrated in FIGS. 2, 3, and 4 may be mounted to a rigid unitary rectangular pallet. The pallet is adapted for handling by conventional fork lift units and provides an extremely versatile modular component of a fuel handling system. The fuel and defueling apparatus described above, when palletized, may be conveniently loaded on the bed of a flatbed truck and moved about without reliance upon a towing vehicle as is required with the vehicle 70 illustrated in FIG. 2. Additionally, the pallet mounted fueling and defueling system 10 is especially adapted for delivery to a remote location by parachute techniques.

Referring particularly to FIGS. 2, 3, and 4, filter-separators 27 and 28 are shown mounted to opposite ends of the vehicle chassis 71. The filter-separators are secured to the chassis by vertically oriented mounting columns 75. The inlet and outlet separator cross-connections 29 and 30, extending between the lower ends of the filter-separators 27 and 28, are displaced upwardly between the separators to accommodate the transverse axle 74. The water balance line 48 extending between the filter-separators 27 and 28 is displaced downwardly between the filter-separators to provide accommodation for the transverse axle 74.

As best illustrated in FIG. 4, the inlet portion 20' of the fuel flow conduit 20 lies transversely of the vehicle 70 across the lower portion thereof. The inlet 11 to the system 10 is at the right end of duct 20' as illustrated in FIG. 4. Adjacent the inlet 11 is mounted the inlet control valve 22. The inlet fluid flow duct 20' extends transversely of the vehicle 70 above the inlet and outlet separator cross-connections 29 and 30 and above the water and fuel balance lines 47 and 48. The outlet portion 20" of the fluid flow conduit 20 extends from the outlet side of the meter 33 across the upper portion of the vehicle 70 to the outlet manifold (not shown) along the left rear portion of the vehicle 70.

The first and second defuel conduits 66 and 68 extend vertically from the outlet fuel flow conduit 20" to the inlet fluid flow conduit 20'. As illustrated, the first defuel conduit 66 is on the left side of the vehicle 70 while the second defuel conduit 68 is substantially in the central portion of the vehicle.

In the embodiment illustrated in FIGS. 2, 3, and 4, it is seen that an extremely compact and highly efficient fluid handling system is provided by this invention. It is reiterated, however, that the system configuration, illustrated in FIGS. 2, 3, and 4 is merely that of a preferred embodiment of the invention. It is entirely consistent with the scope of this invention that the system illustrated in FIG. 1 may be mounted in other geometric configurations than that illustrated, and that vehicles other than that of type 70 illustrated or other than the pallet may be used.

This application is a continuation of my co-pending application Serial No. 198,925, filed May 31, 1962, for Aircraft Fuel and Defuel Apparatus.

While the invention has been described above in conjunction with specific apparatus and with specific dimensions referred to this has been by way of example only and should not be considered as limiting the scope of the invention.

I claim:

1. Fuel distributing and cleaning apparatus for fueling of aircraft comprising:
   (a) a fuel inlet connectible to a fuel source,
   (b) a fuel outlet,
   (c) a pair of fuel-water separation units connected in parallel fluid flow relation between the inlet and outlet, water separated from the fuel accumulating in the lower portion of the separation unit,
      (1) a water balance line connected between the lower portions of the separation units and
      (2) a fuel balance line connected between the separation units above the lower portions thereof, whereby the level of water separated from the fuel is maintained equal in the separation units,
   (d) water level sensing means connected between the water and fuel balance lines operable to manifest a preselected signal when the water level in the separation units reaches a predetermined level in said separation units,
   (e) a fuel flow conduit connected from the inlet to the separation units and from the separation units to the outlet,
   (f) a fuel flow control valve in the fuel flow conduit between the separation units and the inlet and being operable to terminate flow of fuel therethrough in response to the preselected signal of the water level sensing means,
   (g) a fuel strainer unit in the fuel flow conduit between the control valve and the inlet,
   (h) fuel monitoring means in the fuel flow conduit between the separation units and the outlet operative to terminate flow of fuel therethrough in response to the presence of water in the fuel flowing therethrough, and
   (i) fuel metering means in the fuel flow conduit between the monitoring means and the outlet.

2. Fuel distributing and cleaning apparatus for flight-line fueling of aircraft comprising
   (a) a fuel inlet connectible to a fuel source,
   (b) a fuel outlet,
   (c) at least one fuel-water separation unit disposed between the inlet and outlet,
   (d) a fuel flow conduit connected from the inlet to the separation unit and from the separation unit to the outlet,
   (e) a fuel flow control valve in the fuel flow conduit between the separation unit and the inlet, said valve being operable to terminate flow of fuel to the separation unit in response to any one of the following conditions,
      (1) a predetermined pressure drop across the separation unit,
      (2) a predetermined water level in the separation unit, and
      (3) a predetermined pressure level at the outlet,
   (f) fuel strainer means in the fuel flow conduit between the control valve and the inlet,
   (g) fuel monitoring means in the fuel flow conduit between the separation unit and the outlet operative to terminate flow of fuel therethrough in response to the presence of water in the fuel flowing therethrough, and (h) fuel metering means in the fuel flow conduit between the monitoring means and the outlet.

3. Fuel distributing and cleaning apparatus for fueling of aircraft comprising
(a) a fuel inlet connectible to a fuel source,
(b) a fuel outlet,
(c) at least one fuel-water separation unit connected in fluid flow relation between the inlet and outlet,
(d) a fuel flow conduit connected from the inlet to the separation unit and from the separation unit to the outlet,
(e) a fuel flow control valve in the fuel flow conduit between the separation unit and the inlet,
(f) fuel strainer means in the fuel flow conduit between the control valve and the inlet,
(g) fuel monitoring means in the fuel flow conduit between the separation unit and the outlet operative to terminate flow of fuel therethrough in response to the presence of water in the fuel flowing therethrough,
(h) fuel metering means in the fuel flow conduit between the monitoring means and the outlet,
(i) selector means connected to the fuel flow control valve operable to change the valve from one to the other of two pressure regulating conditions of said valve.

4. Fuel distributing and cleaning apparatus for flight-line fueling of aircraft comprising
(a) a fuel inlet connectible to a permanent fuel hydrant,
(b) a fuel outlet,
(c) a pair of fuel-water separation units connected in parallel fluid flow relation between the inlet and outlet,
(d) a fuel flow conduit connected from the inlet to the separation units and from the separation units to the outlet,
(e) a fuel flow control valve in the fuel flow conduit between the separation units and the inlet,
(f) fuel strainer means in the fuel flow conduit between the control valve and the inlet,
(g) fuel monitoring means in the fuel flow conduit between the separation units and the outlet operative to terminate flow of fuel therethrough in response to the presence of water in the fuel flowing therethrough,
(h) fuel metering means in the fuel flow conduit between the monitoring means and the outlet,
(i) a first check valve in the flow conduit adjacent the inlet permitting fuel flow from the inlet toward the strainer means,
(j) a second check valve in the flow conduit between the metering means and the outlet permitting fuel flow toward the outlet,
(k) a first defuel conduit connected to the fuel flow conduit between the second check valve and the outlet and connected to the fuel flow conduit between the first check valve and the strainer means,
(l) a third check valve in the first defuel conduit permitting fuel flow toward fuel flow conduit between the first check valve and the strainer means,
(m) a second defuel conduit connected to the fuel flow conduit between the second check valve and the metering means and connected to the fuel flow conduit between the first check valve and the inlet, and
(n) a fourth check valve in the second defuel conduit permitting fuel flow toward the inlet.

5. Fuel distributing and cleaning apparatus for fueling of aircraft comprising
(a) a fuel inlet connectible to a fuel source,
(b) a fuel outlet,
(c) fuel-water separation means connected in fluid flow relation between the inlet and outlet,
(d) a fuel flow conduit connected from the inlet to the separation means and from the separation means to the outlet,
(e) surge arrestor means connected to the fuel flow conduit between the separation means and the outlet,
(f) a fuel flow control valve in the fuel flow conduit between the separation means and the inlet,
(g) fuel strainer means in the fuel flow conduit between the control valve and the inlet,
(h) fuel monitoring means in the fuel flow conduit between the separation means and the outlet operative to terminate flow of fuel therethrough in response to the presence of water in the fuel flowing therethrough, and
(i) fuel metering means in the fuel flow conduit between the monitoring means and the outlet.

6. Fuel distributing and cleaning apparatus for fueling of aircraft comprising
(a) a fuel inlet connectible to a fuel source,
(b) a fuel outlet,
(c) a pair of fuel-water separation units connected in parallel fluid flow relation between the inlet and outlet, water separated from the fuel accumulating in the lower portion of the separation units,
  (1) a water balance line connected between the lower portions of the separation units and
  (2) a fuel balance line connected between the separation units above the lower portions thereof, whereby the level of water separated from the fuel is maintained equal in the separation units,
(d) a fuel flow conduit connected from the inlet to the separation units and from the separation units to the outlet,
(e) a fuel flow control means including a valve in the fuel flow conduit between the separation units and the inlet, said valve being operable to terminate flow of fuel to the separation units in response to any one of the following conditions,
  (1) a predetermined pressure drop across the separation units,
  (2) a predetermined water level in the separation units, and
  (3) a predetermined pressue level at the outlet,
(f) surge arrestor means connected to the fuel flow conduit between the separation units and the inlet and the outlet, respectively,
(g) fuel strainer means in the fuel flow conduit between the control valve and the inlet,
(h) fuel monitoring means in the fuel flow conduit between the separation units and the outlet to terminate flow of fuel therethrough in the fuel flowing therethrough,
(i) fuel metering means in the fuel flow conduit between the monitoring means and the outlet,
(j) a first check valve in the flow conduit adjacent the inlet permitting fuel flow from the inlet toward the the strainer means,
(k) a second check valve in the flow conduit between the metering means and the outlet permitting fuel flow toward the outlet,
(l) a first defuel conduit connected to the fuel flow conduit between the second check valve and the outlet and connected to the fuel flow conduit between the first check valve and the strainer means,
(m) a third check valve in the first defuel conduit permitting fuel flow toward fuel flow conduit between the first check valve and the strainer means,
(n) a second defuel conduit connected to the fuel fuel flow conduit between the second check valve and the metering means and connected to the fuel flow conduit between the first check valve and the inlet, (o) a fourth check valve in the second defuel conduit permitting fuel flow toward the inlet, (p) at least one center-point fuel nozzle connected to the outlet, (q) at least one over-wing fuel nozzle connected to the outlet, and (r) selector means connected to the fuel flow control valve operable to change the valve from one to the other of two pressure regulating conditions of said valve.

7. Fuel distributing and cleaning apparatus connectible to a fuel source for flight-line fueling of aircraft comprising (a) a fuel inlet, connectible to the fuel source, (b) a fuel outlet, (c) a fuel-water separation unit, water separated from the fuel passing through the inlet accumulating in the lower portion of the unit, (d) a fuel conduit connected from the inlet to the separation unit and from the separation unit to the outlet, (e) water level sensing means connected to the separation unit operable to manifest a preselected signal when the water level in the separation unit reaches a predetermined level, (f) a fuel flow control valve in the fuel flow conduit between the separation unit and the inlet, and operable to terminate flow of fuel therethrough in response to the preselected signal of the water level sensing means, (g) fuel monitoring means in the fuel flow conduit operative to terminate flow of fuel therethrough in response to the presence of water in the fuel flowing therehrough, (h) a fuel strainer unit in the fuel flow conduit between the control valve and the inlet, (i) fuel metering means in the fuel flow conduit between the fuel-water separation unit and the outlet.

8. Fuel distributing and cleaning apparatus connectible to a fuel source for flight line fueling and defueling of aircraft and the like, comprising (a) a fuel inlet connectible to the fuel source, (b) a fuel outlet, (c) a fuel-water separation unit connected between the inlet and the outlet, (d) a fuel flow conduit connected from the inlet to the separation unit and from the separation unit to the outlet, (e) fuel flow control valve in the fuel flow conduit between the separation unit and the inlet, (f) fuel monitoring means in the fuel flow conduit between the separation unit and the outlet operative to terminate flow of fuel therethrough in response to the presence of water in the fuel flowing therethrough, (g) fuel metering means in the fuel flow conduit between the separation unit and the outlet, (h) defuel conduit means cross-connecting the fuel flow conduit between the inlet and the strainer and between the outlet and the meter, and (i) valve means in the defuel conduit means operable to circulate fuel introduced into the outlet to the strainer and to circulate fuel from the meter to the inlet, whereby fuel introduced into the outlet circulates through the control valve, separation unit, monitoring means, and metering means and out the inlet.

9. Fuel handling apparatus for fueling of aircraft and the like, comprising (a) a fuel inlet adapted for connection to a source of fuel, (b) a fuel outlet, (c) fuel-water separation means disposed between the inlet and the outlet, (d) a fuel flow conduit connected from the inlet to the separation means and from the separation means to the outlet, (e) a fuel flow control valve in the fuel flow conduit between the separation means and the inlet, said valve being operable to terminate flow of fuel to the separation means in response to any one of the following conditions:

(1) a predetermined pressure drop across the separation means, (2) a predetermined water level in the separation means, and (3) a predetermined pressure level at the oulet, (f) fuel strainer means in the fuel flow conduit between the control valve and the inlet, (g) fuel monitoring means in the fuel flow conduit between the separation means and the outlet operative to terminate flow of fuel therethrough in response to the presence of water in the fuel flowing therethrough, (h) fuel metering means in the fuel flow conduit between the monitoring means and the outlet, and (i) defuel fuel flow means connected to the fuel flow conduit adjacent the inlet and outlet to cross-connect the conduit and including valve means operable to regulate fuel flow through said defuel means so that fuel introduced into the outlet flows through the strainer, the control valve, the separation means, the monitoring means, and the metering means and out the inlet.

10. Fuel distributing and cleaning apparatus connectible to a fuel source for flight-line fueling of aircraft comprising (a) a fuel inlet, connectible to the fuel source, (b) a fuel outlet, (c) a fuel-water separation unit, water separated from the fuel passing through the inlet accumulating in the lower portion of the unit, (d) a fuel flow conduit connected from the inlet to the separation unit and from the separation unit to the outlet, (e) water level sensing means connected to the separation unit operable to manifest a preselected signal when the water level in the separation unit reaches a predetermined level, (f) a fuel flow control valve in the fuel flow conduit operable to terminate flow of fuel therethrough in response to the preselected signal of the water level sensing means, (g) fuel monitoring means in the fuel flow conduit operative to terminate flow of fuel therethrough in response to the presence of water in the fuel flowing therethrough, (h) a fuel strainer unit in the fuel flow conduit toward the inlet from the separation unit, (i) fuel metering means in the fuel flow conduit between the fuel-water separation unit and the outlet.

11. Fuel distributing and cleaning apparatus connectible to a fuel source for flight line fueling and defueling of aircraft and the like, comprising (a) a fuel inlet connectible to the fuel source, (b) a fuel outlet, (c) a fuel-water separation unit connected between the inlet and the outlet, (d) a fuel flow conduit connected from the inlet to the separation unit and from the separation unit to the outlet, (e) fuel flow control means in the fuel flow conduit for controlling the rate of fuel flow through the conduit, (f) fuel monitoring means in the fuel flow conduit between the separation unit and the outlet operative to terminate flow of fuel therethrough in response to the presence of water in the fuel flowing therethrough (g) fuel metering means in the fuel flow conduit, and (h) a fuel strainer unit in the fuel flow conduit disposed toward the inlet from the separation unit conduit between the inlet and the strainer and between the outlet and the meter.

12. Fuel handling apparatus for fueling of aircraft and the like, comprising
(a) a fuel inlet adapted for connection to a source of fuel,
(b) a fuel outlet,
(c) fuel-water separation means disposed between the inlet and the outlet,
(d) a fuel flow conduit connected from the inlet to the separation means and from the separation means to the outlet,
(e) fuel flow control means in the fuel flow conduit for controlling the rate of fuel flow through the conduit,
(f) fuel strainer means in the fuel flow conduit disposed toward the inlet from the separation unit,
(g) fuel monitoring means in the fuel flow conduit between the separation means and the outlet operative to terminate flow of fuel therethrough in response to the presence of water in the fuel flowing therethrough,
(h) fuel metering means in the fuel flow conduit, and
(i) defuel fuel flow means connected to the fuel flow conduit adjacent the inlet and outlet to cross-connect the conduit and including valve means operable to regulate fuel flow through said defuel means so that fuel introduced into the outlet flows through the flow control means, the separation means, the monitoring means, and the metering means in the same sequence as when introduced into the inlet and out the inlet.

References Cited by the Examiner
UNITED STATES PATENTS

| | | | |
|---|---|---|---|
| 2,600,876 | 6/52 | Jauch et al. | 222—20 |
| 2,680,538 | 6/54 | Fishburn | 222—23 |
| 2,773,556 | 12/56 | Meyers et al. | 210—96 X |
| 2,842,152 | 7/58 | Winter et al. | 210—96 X |

LOUIS J. DEMBO, *Primary Examiner.*

UNITED STATES PATENT OFFICE
CERTIFICATE OF CORRECTION

Patent No. 3,169,667 February 16, 1965

Richard T. Headrick

It is hereby certified that error appears in the above numbered patent requiring correction and that the said Letters Patent should read as corrected below.

Column 12, line 73, strike out "and"; line 75, after "unit" insert -- , and (i) defuel conduit means cross connecting the fuel flow --.

Signed and sealed this 14th day of September 1965.

(SEAL)
Attest:

ERNEST W. SWIDER
Attesting Officer

EDWARD J. BRENNER
Commissioner of Patents